(12) United States Patent
Leschner

(10) Patent No.: US 9,852,117 B1
(45) Date of Patent: Dec. 26, 2017

(54) TEXT-FRAGMENT BASED CONTENT EDITING AND PUBLISHING

(71) Applicant: Haydn Labs, Inc., Cambridge, MA (US)

(72) Inventor: Jurgen Leschner, Lexington, MA (US)

(73) Assignee: HAYDN LABS, INC., Cambridge, MA (US)

(*) Notice: Subject to any disclaimer, the term of this patent is extended or adjusted under 35 U.S.C. 154(b) by 134 days.

(21) Appl. No.: 14/726,900

(22) Filed: Jun. 1, 2015

(51) Int. Cl.
- G06F 15/00 (2006.01)
- G06F 17/22 (2006.01)
- H04L 29/08 (2006.01)
- G06F 17/30 (2006.01)

(52) U.S. Cl.
CPC ...... G06F 17/2288 (2013.01); G06F 17/2247 (2013.01); G06F 17/30896 (2013.01); H04L 67/02 (2013.01)

(58) Field of Classification Search
CPC .......................................................... G06F 8/30
See application file for complete search history.

(56) References Cited

U.S. PATENT DOCUMENTS

| | | | | |
|---|---|---|---|---|
| 2004/0073708 A1* | 4/2004 | Warnock | ............. | G06F 17/2247 709/246 |
| 2006/0218490 A1* | 9/2006 | Fink | ...................... | G06F 17/211 715/234 |
| 2013/0246908 A1* | 9/2013 | Buehler | ............. | G06F 17/3089 715/234 |
| 2015/0007132 A1* | 1/2015 | Baldwin | ............. | G06F 17/3089 717/110 |
| 2015/0100406 A1* | 4/2015 | Klimetschek | ...... | G06Q 30/0242 705/14.41 |

OTHER PUBLICATIONS

Fletcher T. Penney, What is MultiMarkdown? Apr. 4, 2011, retreived from https://appletree.or.kr//quick_reference_cards/Markdown-Textile-Haml/what_is_multimarkdown.pdf on Jun. 11, 2017.*

HTML Comments, Feb. 28, 2014, w3schools.com/html/html_comments.asp, 2 pages.*

HTML Editors, Jun. 3, 2012, w3schools.com:80/HTML/html_editors.asp, 2 pages.*

Fletcher T. Penney, Whats different in MultiMarkdown 3.0, Apr. 9, 2011, retreived from https://github.com/fletcher/peg-multimarkdown/wiki/What's-different-in-MultiMarkdown-3.0%3F Jun. 11, 2017.*

* cited by examiner

*Primary Examiner* — Mohammed-Ibrahim Zuberi
(74) *Attorney, Agent, or Firm* — BainwoodHuang

(57) ABSTRACT

Text-fragment based content editing and publishing, in which a text-fragment is created in response to a trigger event by receiving text and storing the received text into the text-fragment. The text-fragment is added to a text file containing multiple text-fragments. The trigger may be received by an editor from a user interface or through an application programming interface to the editor. A publishable output is generated in response to the text-fragments in the text file and a selected theme defining the appearance of one or more Web pages within the publishable output. One or more previews of the publishable output may be displayed together with one or more of the text fragments within the user interface. Metadata in individual text-fragments may include versioning labels and other information. Ordering of the text-fragments in the text file may indicate an order in which content is provided within the publishable output.

22 Claims, 9 Drawing Sheets

TEXT-FRAGMENT BASED CONTENT EDITING AND PUBLISHING

BACKGROUND

As it is generally known, a Web content management system (WCM) is a software system that provides Website authoring, collaboration, and administration tools designed to allow users with little knowledge of Web programming languages or markup languages to create and manage Website content with relative ease. WordPress, provided by Automattic Inc., is a well-known example of an existing content management system (CMS). WordPress is based on the PHP (Personal Home Page) server side scripting language and the MySQL® relational database management system of Oracle Corporation.

SUMMARY

Previous approaches to Web content management have exhibited significant shortcomings. In general, it would be desirable for a Web content management system to be able to produce output that may be effectively displayed in a wide variety of different display contexts. For example, it would be desirable for a Web content management system to be able to produce output that may be displayed as a Website through a browser executing on a target display device, such as desktop, laptop, and/or smaller handheld computerized device, e.g. a tablet or smart phones. In addition, it would be desirable for a Web content management system to be able to produce output that may be displayed as an electronic book (e-book) or the like. It would also be desirable for such systems to enable users to write content using an easy-to-read, easy-to-write plain text format. Existing solutions have fallen short with regard to these objectives.

Many existing Web content management systems store content in database tables, which cannot be directly edited, and which require costly administrative resources to maintain. These previous solutions are accordingly expensive to maintain, and difficult to use for many users who may simply desire to maintain and preview their own content on their own personal computer. In addition, by storing the content in databases, these systems make it difficult to move the content, and may require special import and export software to do so. An even further drawback to previous Web content management systems that store content in databases is that it is difficult to compare versions of the stored content. Comparing content stored in databases may also require special software, and such previous solutions are not be compatible with available source-code-versioning software.

A further drawback of previous Web content management systems is that they make it difficult for a user to perform bulk changes on text in databases because they require special tools to operate on parts of the text in specific columns. An operation such as search and replace across the content for multiple pages may accordingly require the use of special software, and cannot be simply performed with a text-editor.

In addition, storing content in text files has not been considered a viable approach for general purpose Web content management systems. This view has resulted from the limitations of Markdown and other existing markup languages like HyperText Markup Language (HTML). While some relatively simple, regular-structured Web sites like weblogs and wikis have used files instead of databases to store content, these previous approaches have been highly restrictive with regard to where the content files may be stored, and with regard to the content that the files are allowed to contain. For example, it is not possible to store multiple weblog posts about a common topic in a single file using such existing systems, because they are programmed to assume that each file contains a single post.

Markdown is an existing markup language that uses a plain text formatting syntax, designed so that it can be converted to HyperText Markup Language (HTML) and other formats. Markdown is limited to single column formatting, and one Web page per source file. Markdown also provides no support for additional content to be displayed around text content, such as sidebars, footnotes, etc. Markdown functions for a single stream of content, but cannot support the additional structures that are often desirable for Web pages, such as hierarchical and/or nested structuring of content. Markdown is an example of a previous solution that is oriented towards relatively basic content structures, and that fails to meet the needs of more sophisticated users and content publishers who may require additional structures in the published output beyond a single stream of text content. While a Markdown file can contain headings with paragraphs, it is a limited solution because it provides no way to add other metadata, e.g. about the content author's intended meaning for specific paragraphs or sections, about drafts and/or versions, etc.

The shortcomings of previous Web content management solutions are even more apparent when considered in the context of the different types of target display devices and/or display contexts through which content must be published. For example, in the case of a Web page containing a list of employees in which each employee of an organization is represented by a picture and associated text, the list may be displayed differently on different target display devices. When displayed through a Web browser program executing on a desktop or laptop computer system, the list may be rendered with multiple columns. However, when the same list is displayed on a smaller target display device, the displayed list may be limited to only one or two columns. Additionally, navigation of the list may be performed differently on different types of target display devices or in different display contexts. For example, when viewing the list on a smartphone, a user may traverse the elements in the list by swiping sideways on the display, for example to move between individual employee entries, whereas on a desktop or laptop computer display, the user may employ a scroll bar or the like to move through the list. Thus the need to support content access on different types of target display devices and/or within display contexts may require support for more sophisticated and richer sets of content structures and/or differing navigational gestures than can be provided using previous Web content management solutions such as Markdown.

In order to address the above described and other shortcomings of previous approaches to Web content management, a system is disclosed for text-fragment based content editing and publishing. In the disclosed system, a text-fragment trigger is received. In response to receipt of the text-fragment trigger, the disclosed system creates a text-fragment by receiving text for the text-fragment and storing the received text into the text-fragment. The disclosed system adds the text-fragment to a text file containing multiple text-fragments, and may display at least one of the text-fragments contained in the text file to a user through at least a first portion of a user interface.

Further in the disclosed system, a theme is selected that defines the appearance of a publishable output such as a Web page. For example, a user that is creating the text file may select a theme through one or more user interface object provided in the user interface. The disclosed system generates, based on the text-fragments in the text file and the selected theme, a publishable output. The system may display one or more previews of the publishable output within at least a second portion of the user interface, and publishes the output to at least one remote system.

In another aspect of the disclosed system, the system creates the text-fragment by, at least in part, receiving and/or creating meta-data for the text-fragment that describes the text-fragment and storing the metadata into the text-fragment.

In another aspect of the disclosed system, the text-fragment trigger includes a name provided by a user for the text-fragment, and generating the meta-data for the text-fragment includes storing a URL to be associated with a Web page generated from the text fragment based on the name provided by the user for the text-fragment. For example, the URL for the text-fragment may be generated such that the URL includes the name provided by the user. The system may then generate the meta-data for the text-fragment by storing the URL for the text-fragment in the meta-data for the text-fragment.

In another aspect of the disclosed system, the text-fragment trigger may include an image provided by a user for the text-fragment, and generating the meta-data for the text-fragment may include storing at least one pointer to the image provided by the user for the text-fragment in the meta-data for the text-fragment.

In another aspect of the disclosed system, storing at least one pointer to the image provided by the user for the text-fragment in the meta-data for the text-fragment may be performed at least in part by storing multiple pointers in the meta-data for the text-fragment, where each of the pointers points to a different size version of the image provided by the user for the text-fragment. For example, the pointers may include a first pointer pointing to a first version of the image that is a thumbnail version of the image, a second pointer pointing to a second version of the image that is a small device size version of the image suitable for display on target devices having relatively small display screens, and a third pointer pointing to a third version of the image that is a large device size version of the image, that is larger than the small device size version of the image and suitable for display on target devices having relatively large display screens. Generating the publishable output may include storing the multiple pointers in the publishable output.

In another aspect of the disclosed system, generating the publishable output may include generating multiple Web pages, where each of the multiple Web pages corresponds to at least one of the text-fragments in the text file. At least one of the generated Web pages displays i) an image based on a pointer to the image contained in the metadata of a text-fragment corresponding to the web page, and ii) the text of the text-fragment corresponding to the web page.

In another aspect of the disclosed system, at least one versioning label may be received through the user interface, for association with at least one text-fragment. The disclosed system associates the versioning label with the text-fragment when generating the text-fragment, e.g. by storing the versioning label in the metadata for the text-fragment, and generating the publishable output may include creating different versions of the publishable output in response to the versioning label.

For example, the versioning label may be a draft label, and generating the publishable output may include i) identifying text-fragments in the content text file that have a draft label stored in their metadata, and ii) generating the publishable output based only on those text-fragments in the content text file that do not have a draft label stored in their metadata. The disclosed system may then generate a draft output based on both those text-fragments in the content text file that have a draft label stored in their metadata and those text-fragments in the content text file that do not have a draft label stored in their metadata, and distribute the draft output to a number of reviewing users. The disclosed system then responds to receipt of a publish command by modifying the text-fragments in the content text file, responsive to receipt of the publish command, by removing the draft label from the metadata of one or more of the text-fragments in the content text file, and generating a new version of the publishable output, after modifying the text-fragments in the content text file.

In another aspect of the disclosed system, the versioning label may be an update label, and storing the metadata for each text-fragment that includes an update label may include storing the update label in the metadata for the text-fragment and storing a pointer to a previously published text-fragment to be replaced by the text-fragment in the metadata for the text-fragment. Generating the publishable output may include i) identifying text-fragments in the content text file that have an update label stored in their metadata, and ii) generating the publishable output based only on those text-fragments in the content text file that do not have an update label stored in their metadata. The disclosed system may further generate a draft output based on both those text-fragments in the content text file that have an update label stored in their metadata and those text-fragments in the content text file that do not have an update label stored in their metadata, but without those previously published text-fragments that are to be replaced by the text-fragments that have an update label stored in their metadata. The disclosed system may then distribute the draft output to a number of reviewing users. In response to receipt of a publish command, the disclosed system may modify the text-fragments in the content text file by removing the text-fragments that are to be replaced by the text-fragments that have an update label stored in their metadata, and by removing the update label from the metadata of at least one of the text-fragments. The disclosed system may further generate a new version of the publishable output, in response to receipt of the publish command and after modifying the text-fragments in the content text file.

In another aspect of the disclosed system, receiving the text-fragment trigger may include receiving the text-fragment trigger through a user interface.

In another aspect of the disclosed system, receiving the text-fragment trigger may include receiving the text-fragment trigger from a separate application through an application programming interface.

In another aspect of the disclosed system, receiving text for the text-fragment may include receiving the text for the text-fragment through the user interface.

In another aspect of the disclosed system, receiving text for the text-fragment may include receiving the text for the text-fragment through the application programming interface.

In another aspect of the disclosed system, the arrangement of the text-fragments within the text file indicates a text-fragment ordering, and generating the publishable output includes generating content within the publishable output based on the text-fragment ordering indicated by the arrangement of the text-fragments within the content text file.

In another aspect of the disclosed system, the content text file is human editable, such that it can be edited using a text editor or the like, and/or using any kind of editor that is suitable for editing software program source code or the like. In this way the text-fragments in the content text files of the disclosed system code may be directly edited by users who understand the disclosed syntax for fragment delimiters and metadata, and can accordingly manually add, modify, re-order and/or delete the text-fragments in the content text file directly using such a text editor. At the same time, other less-sophisticated users can edit the text-fragments in the file indirectly using external user interfaces that generate content that is passed through the application programming interface (API) of an editor provided in an embodiment of the disclosed system.

Thus there is disclosed a system for text-fragment based content editing and publishing that addresses shortcomings found in previous approaches to Web content management. The disclosed system provides multiple advantages over previous solutions. The disclosed system produces output that may be effectively displayed in a wide variety of different display contexts, and enables users to write content for publication using an easy-to-read, easy-to-write plain text format. The disclosed system stores content in text files, as opposed to database tables. The text files used to store content in the disclosed system can be directly and conveniently edited, stored, and maintained, without requiring costly administrative resources. The text files used to store content in the disclosed system are easy to use, for example by users who desire to maintain and preview their own content on their own personal computer, and do not require special software to be moved. Because the disclosed system uses text files to store content, content developed through the disclosed system can be conveniently compared without the need for additional special software. For example, the text files used in the disclosed system may be compared using one of the generally available "Diff" tools or the like.

The disclosed system may also provide a convenient approach to versioning within the generated text files that enables a user to work with draft versions of content without publishing the draft versions until they have been approved for release, while continuing to publish the previously published version of the content.

The text files generated through the disclosed system may advantageously provide multiple pages, posts, etc., within a single text file, based on the text-fragments contained in the text file.

The disclosed system also advantageously enables the user to perform "bulk" changes to content representing multiple pages of a Website. Such "bulk" changes may be conveniently performed on the text files generated by the disclosed system, for example using a text-editor or the like.

The disclosed system advantageously supports the indication and use of sophisticated content structures in the published output that are unavailable in previous solutions that use plain text, such as Markdown. For example, the disclosed system supports the ability for a user to indicate additional content that is to be displayed around text content, such as sidebars, footnotes, etc., as well as hierarchical and/or nested structuring of content. The disclosed system also enables the user to add metadata to each text-fragment contained in the text file with regard to, for example, the content author's intended meaning for specific paragraphs or sections, about drafts and/or versions, etc.

The disclosed system further overcomes the shortcomings of previous Web content management solutions with regard to operating with different types of target display devices and/or display contexts through which content may be published. The disclosed system also conveniently supports generation of publishable content that may use different forms of content navigation on different types of target display devices and/or in different display contexts.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Figure 1:
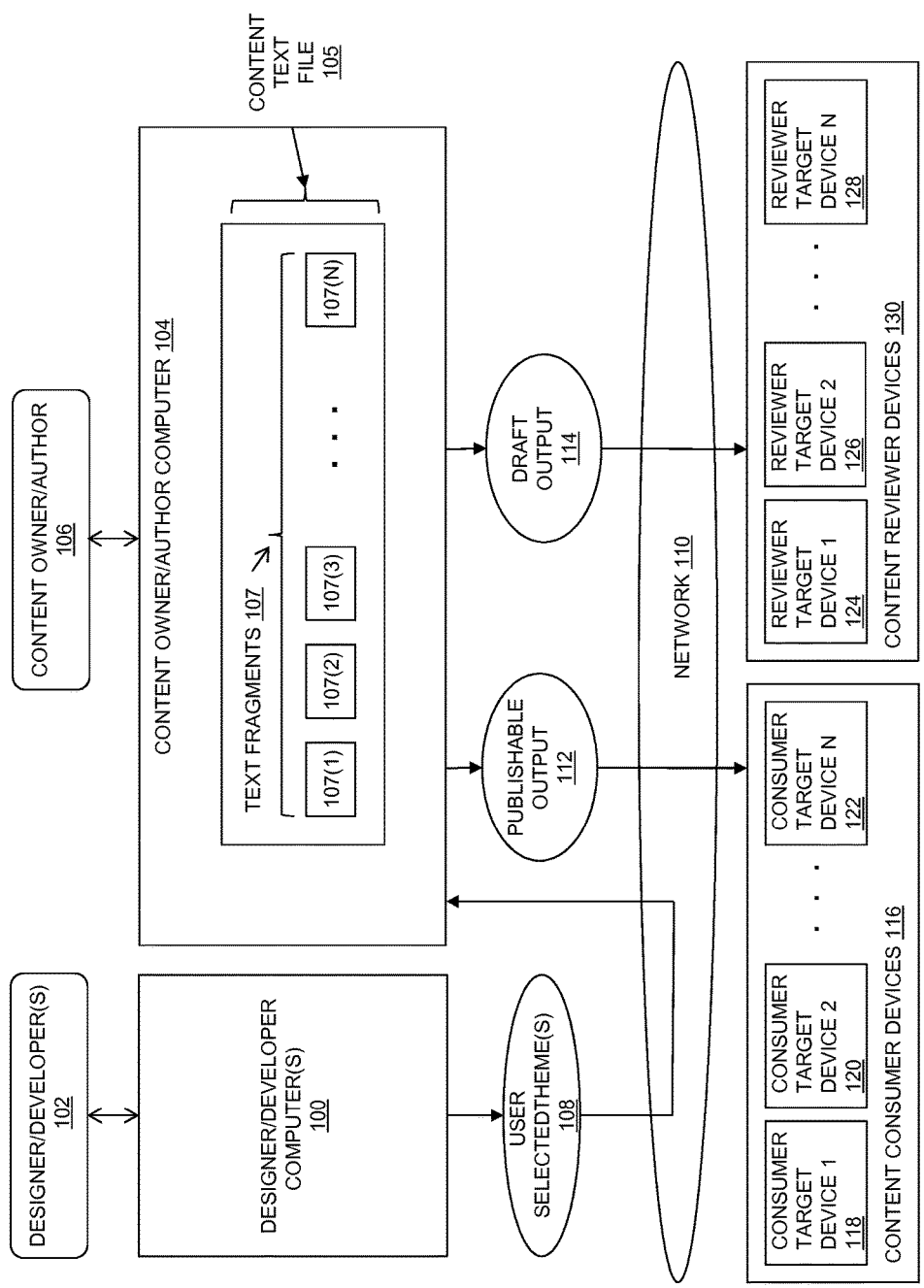
FIG. 1 is a block diagram showing components in an example of an execution environment including an illustrative embodiment of the disclosed system.

FIG. 1 is a block diagram showing components in an example of an execution environment including an illustrative embodiment of the disclosed system. As shown in FIG. 1, one or more Designer/Developer Computer(s) 100 are associated with and used by one or more designer and/or developer users, shown in FIG. 1 as Designer/Developer(s) 102. A Content Owner/Author Computer 104 is associated with and used by a content owner and/or content author user, shown as Content Owner/Author 106.

During operation of the embodiment shown in FIG. 1, the Content Owner/Author 106 creates and/or selects content for publication, e.g. through one or more user interfaces or the like. The content created and/or selected by the Content Owner/Author 106 on the Content Owner/Author Computer 104 may include text, images, and/or any other specific types of content. The content for publication may, for example, include text created by the Content Owner/Author 106 by typing or otherwise entering text into a user interface of the Content Owner/Author Computer 104, and/or by selecting one or more images, e.g. through a user interface of the Content Owner/Author Computer 104. The images selected by Content Owner/Author 106 may be stored either locally on the Content Owner/Author Computer 104, and/or stored remotely on another computer system, e.g. on a server system or the like that may be accessed by the Content Owner/Author Computer 104 over the Network 110.

The content created (e.g. typed or otherwise entered) by Content Owner/Author 106 using Content Owner/Author Computer 104, and/or selected by Content Owner/Author 106 using Content Owner/Author Computer 104, is represented by the disclosed system as a number of text-fragments, shown as Text Fragments 107 (e.g. Text Fragment 107(1), Text Fragment 107(2), Text Fragment 107(3), through Text Fragment 107(N)), which are stored within a Content Text File 105.

The Content Owner/Author 106 may further select and/or indicate through a user interface one or more themes to be applied to the content created and/or selected by the Content/Owner Author 106 on the Content Owner/Author Computer 104. For example, Content Owner Author 106 may select one or more themes developed and/or provided by Designer/Developer(s) 102, and for example stored on Designer/Developer Computer(s) 100, shown for purposes of illustration in FIG. 1 as User Selected Theme(s) 108. User Selected Themes 108 may, for example, define the appearance of a Web page within a publishable output generated based on the Content Text File 105. User Selected Theme(s) 108 may, for example, be communicated from Designer/Developer Computer(s) 100, to Content Owner/Author Computer 104 over one or more communication networks, shown for purposes of illustration in FIG. 1 by Network 110.

A Publishable Output 112 is generated by the Content Owner/Author Computer 104, for example by applying the User Selected Theme(s) 108 to the Text Fragments 107 in Content Text File 105. The Publishable Output 112 may, for example, be made up of or include HyperText Markup Language (HTML), for example contained within a number of Web pages within a Web site or the like. The Publishable Output 112 may, for example, be published through the Network 110, for example by way of a content delivery network (CDN) or the like, using a distributed system of servers deployed in multiple data centers across the Internet.

The Publishable Output 112 may be published to general content consumer users, e.g. by delivery to a number of Content Consumer Devices 116, shown for purposes of illustration as including Consumer Target Device 1 118, Consumer Target Device 2 122 through Consumer Target Device N 122.

In one embodiment, the Content Text File 105 also includes versioning information that supports generation of a Draft Output 114. The Draft Output 114 contains content that is not yet finalized for general publication to the Content Consumer Devices 116. The disclosed system uses the versioning information contained in the Content Text File 105 to determine which content from within Content Text File 105 is to be used to generate the Draft Output 114. The Draft Output 114 may be distributed to a number of draft content reviewer users, e.g. through a number of Content Reviewer Devices 130, shown for purposes of illustration as including Reviewer Target Device 1 124, Reviewer Target Device 2 126, through Reviewer Target Device N 128. The reviewer users may, for example, be members of a review committee or the like responsible for approving content contained in the Draft Output 114 for general publication before it is permitted to be published as to the Content Consumer Devices 116 as part of the Publishable Output 112. For example, after reviewing the Draft Output 114, each of the draft content reviewer users may provide an indication or vote as to whether the content contained in Draft Output 114 may be published to the Content Consumer Devices 116. Such a vote or other indication may be provided through any specific kind of communication provided from the Content Reviewer Devices 130 to the Content Owner/Author Computer 104, e.g. in one or messages (electronic mail, text messages, etc.) conveyed over the Network 110 from each of the draft content reviewer users.

The Designer/Developer Computer(s) 100 and/or Content Owner/Author Computer 104 may each consist of or include at least one processor, and program storage, such as memory and/or another non-transitory computer readable medium, for storing program code (e.g. instructions) executable on the processor, and for storing data operated on by such program code, including but not limited to Content Text File 105. Each of Designer/Developer Computer(s) 100 and/or Content Owner/Author Computer 104 may further include one or more input/output devices and/or interfaces, such as data communication and/or peripheral devices and/or interfaces, including a communication interface communicably coupled to Network 110, as well as a computer keyboard and computer mouse, and a display device operable to provide a user interface such as a graphical user interface and/or command line interface. The program code executing on Designer/Developer Computer(s) 100 and/or Content Owner/Author Computer 104 may further include appropriate operating system and/or application software or tools.

For example, Content Owner/Author Computer 104 may include program code that, when executed, causes Content Owner/Author Computer 104 to receive, generate, and/or store the Text Fragments 107 in Content Text File 105. Content Owner/Author Computer 104 may further include program code that, when executed, receives User Selected Theme(s) 108 and applies User Selected Theme(s) 108 to Content Text File 105 in order to generate Publishable Output 112, and to publish Publishable Output 112 to Content Consumer Devices 116.

For further example, Content Owner/Author Computer 104 may include program code that, when executed, causes Content Owner/Author Computer 104 to determine, based on versioning information contained in the Content Text File 105, which content from within Content Text File 105 is to be used to generate the Draft Output 114 that is distributed to Content Reviewer Devices 130. Content Owner/Author Computer 104 may further include program code that, when executed, causes Content Owner/Author Computer 104 to update Publishable Output 112 to include content previously published only within Draft Output 114, for example in response to a number of votes or other indications of approval from content reviewer users associated with Content Reviewer Devices 130, and/or in response to an indication or "publish" command issued by Content Owner/Author 106 through a user interface of Content Owner/Author Computer 104.

Content Consumer Devices 116 and Content Reviewer Devices 130 may include various specific types of devices operable to display received content, such as desktop or laptop computers, tablet or handheld computers, smartphones, personal digital assistants, and/or any other specific type of electronic device that is operable to display received content to an associated user.

Figure 2:
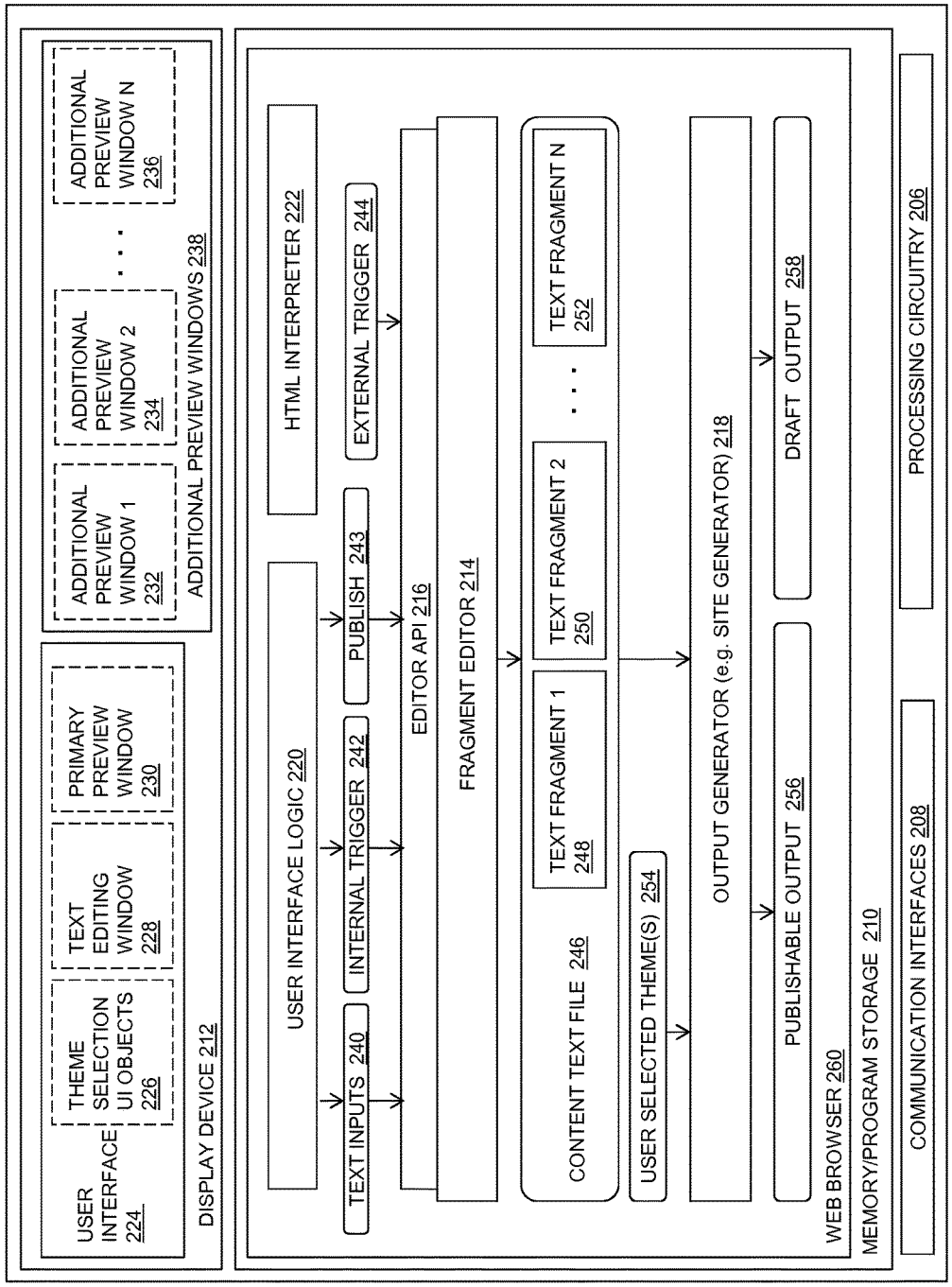
FIG. 2 is a block diagram showing components in an example of a content owner/author computer system in an illustrative embodiment.

FIG. 2 is a block diagram showing components in an example of a content owner/author computer system in an illustrative embodiment. As shown in FIG. 2, in one embodiment of the disclosed system, a Content Owner/Author Computer 204 includes Processing Circuitry 206, Communication Interfaces 208, Memory/Program Storage 210, and a Display Device 212. Display Device 212 may include or consist of any specific type of output device operable to present information in visual form. Communication Interfaces 208 may, for example, include or consist of one or more network interface cards (NICs) or the like. Processing Circuitry 206 may, for example, include or consist of one or more microprocessors or the like. Memory/Program Storage 210 may, for example, include or consist of any specific type of volatile and/or non-volatile semiconductor memory or the like that is operable to store program code (e.g. sequences of instructions) that is executable and/or executed by the Processing Circuitry 206, and/or data (e.g. program code state information, program code inputs, program code outputs, etc.), for use in or by the Content Owner/Author Computer 204.

In the embodiment of FIG. 2, the program code stored in Memory/Program Storage 210 and executable on the Processing Circuitry 206 may, for example, include a Fragment Editor 214 having an Editor Application Programming Interface (API) 216, User Interface Logic 220, HTML Interpreter 22, and Output Generator 218. Program stored in Memory/Program Storage 210 may further include other program code, including but not limited to operating system and/or other application or utility program code.

During operation of the embodiment of the Content Owner/Author Computer 204 shown in FIG. 2, the User Interface Logic 220 provides a User Interface 224 that is displayed to a user of Content Owner/Author Computer 204 through the Display Device 212. The User Interface 224 includes Theme Selection User Interface (UI) Objects 226, a Text Editing Window 228, and a Primary Preview Window 230. Additional Preview Windows 238 may also be provided within the Display Device 212, shown for purposes of illustration in FIG. 2 as including Additional Preview Window 1 232, and Additional Preview Window 2 234 through Additional Preview Window N 236. The Additional Preview Windows 238 may, for example be provided by either the User Interface Logic 220 and/or the HyperText Markup Language (HTML) Interpreter 222 based on the Publishable Output 256 and/or the Draft Output 258.

Further during operation of the embodiment shown in FIG. 2, a text-fragment trigger is received by the Fragment Editor 214 through the Editor API 216. The text-fragment trigger may either be an internal trigger, shown by Internal Trigger 242, or an External Trigger 244. The Internal Trigger 242 may, for example, consist of a name to be associated with a text-fragment, such as a URL to be associated with a Web page or other content unit to be generated in a publishable output in response to the text-fragment. The name provided to the Editor API 216 may, for example, be entered (e.g. typed) by a user of Content Owner/Author Computer 204 through the User Interface 224, and passed to Fragment Editor 214 through Editor API 216 as part of Internal Trigger 242.

The External Trigger 244 may, for example, consist of or include a pointer to an image. For example, in one embodiment, the External Trigger 244 may include a pointer to an image received by the Editor API 216 from an application or other type of program executing on Content Owner/Author Computer 204, that is separate from the Fragment Editor 214. For example, an image pointer contained within External Trigger 244, and received by Fragment Editor 214 through Editor API 216, may be a pointer to an image that the user of Content Owner/Author Computer 204 dragged into or over a predetermined directory or folder graphical object associated with Fragment Editor 214, e.g. within a user interface that is external to User Interface 224, for example within a virtual desktop graphical user interface provided to a user of Content Owner/Author Computer 204 by program code executing on Content Owner/Author Computer 204.

In response to receipt of either the Internal Trigger 242, or in response to receipt of the External Trigger 244, the Fragment Editor 214 creates a text-fragment by receiving text for the text-fragment and storing the received text into the text-fragment. For example, the Fragment Editor may receive text to be stored in the text-fragment as Text Inputs 240 from the User Interface Logic 220. The Text Inputs 240 may include or consist of text entered (e.g. typed) by the user of Content Owner/Author Computer 204 into Text Editing Window 228 within the User Interface 224.

Further during operation of the embodiment shown in FIG. 2, for example in response to receipt of a "Done" or "Add" command or indication from the user of Content Owner/Author Computer 204 through the User Interface 224, the Fragment Editor 214 adds the text-fragment to a text file containing multiple text-fragments. For example, the Fragment Editor 214 may add the newly created text-fragment to Content Text File 246, shown for purposes of illustration in FIG. 2 as including Text Fragment 1 248, and Text Fragment 2 250 through Text Fragment N 252. One or more of the text-fragments in the Content Text File 246 may be displayed to a user of Content Owner/Author Computer 204. For example, one of the text-fragments stored in Content Text File 246, or a newly created text-fragment that has not yet been added to Content Text File 246, may be displayed to a user of Content Owner/Author Computer 204 within the Text Editing Window 228 in the User Interface 224, and made available for editing by the user through the Text Editing Window 228.

Further during operation of the embodiment shown in FIG. 2, a theme may be selected that defines the appearance of a Web page. For example, a user may select a theme, shown for purposes of illustration in FIG. 2 by User Selected Theme(s) 254. In one embodiment, User Selected Theme(s) 254 may include data that defines colors, graphics and styles to be used when generating output based on the Content Text File 246. For example, User Selected Theme(s) 254 may determine the appearance of one or more Web pages in the output generated based on Content Text File 246. User Selected Theme(s) 254 may determine the appearance of one or more output Web pages, for example by using a color scheme to set the color of body text, headings, hyperlinks, page banner text, link bar labels, table borders, and/or the page background used in the output Web page(s). User Selected Theme(s) 254 may determine the specific graphics used for page elements in one or more output Web pages, such as a background picture, a page banner, bullets, navigation buttons, and/or horizontal lines used in the output Web page(s). And User Selected Theme(s) 254 may determine the specific styles for one or more output Web pages, such as the fonts for the body text and/or headings used in the output Web page(s).

For example, a user of Content Owner/Author Computer 204 may select a theme to be used when generating output based on the Content Text File 246 by using one or more user interface objects provided within the User Interface 224, such as Theme Selection User Interface (UI) Objects 226. The theme or themes selected by the user using Theme Selection User Interface (UI) Objects 226 may then be copied to the Content Owner/Author Computer 204, as shown for purposes of illustration by User Selected Theme(s) 254 in FIG. 2.

User Selected Theme(s) 254 enable non-technical users to use a design and/or code produced by other, more technical users, who build and then package their designs in the form of themes which other people can select and use for publishing content. The User Selected Theme(s) 254 accordingly allow non-technical users (e.g. Content Owner/Author 106 in FIG. 1) to focus on writing content (e.g. text), without having to spend excessive time developing and/or designing specific formatting, layout and/or code to be used for handling reader interactions on, for example, a Web site or the like generated using their content.

Further during operation of the embodiment shown in FIG. 2, the Output Generator 218 generates, based on the text-fragments in the Content Text File 246 and the User Selected Theme(s) 254, a Publishable Output 256. The Publishable Output 256 may, for example, include or consist of HTML describing one or more Web pages. The Publishable Output 256 may be made up of a number of Web pages that make up a Web site or other content structure. Accordingly, in one embodiment, the Output Generator 218 includes or consists of a Web site generator. The Publishable Output 256 may be passed to or made accessible to HTML Interpreter 222 in order to generate Primary Preview Window 230, as well as Additional Preview Windows 238. For example, in one embodiment, each of the Additional Preview Windows 238 displays a rendering of HTML contained in the Publishable Output 256 as it would be displayed on a specific type of target device. For example, one of the Additional Preview Windows 238 may display the Publishable Output 256 as it would be displayed on a tablet device, while another of the Additional Preview Windows 238 may display the Publishable Output 256 as it would be displayed on a smartphone, etc. In this way the Additional Preview Windows 238 enable a user of the Content Owner/Author Computer 204 to view the Publishable Output 256 as it will be displayed on the displays of various different types of target devices.

The Content Owner/Author Computer 204 further operates to publish the Publishable Output 256 to a number of content consumer users, by providing the Publishable Output 256 to some number of content consumer devices (e.g. Content Consumer Devices 116 shown in FIG. 1), for example by way of a content delivery network (CDN) or the like, using a distributed system of servers deployed in multiple data centers across the Internet.

Further during operation of the embodiment shown in FIG. 2, the Fragment Editor 214 may further create one or more of the text-fragments in the Content Text File 246 by, at least in part, receiving and/or creating meta-data for the text-fragment, and by storing the metadata for the text-fragment into the text-fragment. For example, meta-data text for a given one of the text-fragments within the Content Text File 246 may be entered by the user by typing text into the Text Editing Window 228, which is passed to the Fragment Editor 214 in Text Inputs 240, and is then stored by the Fragment Editor 214 into a meta-data portion of the text-fragment. Alternatively, the meta-data text for a given one of the text-fragments within the Content Text File 246 may be automatically created in whole or in part by the Fragment Editor 214, and then stored as text within the meta-data portion of the text-fragment.

Further during operation of the embodiment shown in FIG. 2, the Internal Trigger 242 may include or consist of a name entered into the User Interface 224 by a user of Content Owner/Author Computer 204. The Fragment Editor 214 may operate to store the name received in the Internal Trigger 242 into a meta-data portion of one of the text-fragments contained in the Content Text File 246. For example, the received name may be stored as at least part of a URL that is contained within the meta-data portion of one of the text-fragments stored in the Content Text File 246. When the Output Generator 218 generates the Publishable Output 256, the Output Generator 218 may process each text-fragment in the Content Text File 246 by creating a corresponding Web page indicated by a URL containing or equal to the URL contained within the meta-data portion of the text fragment.

Further during operation of the embodiment shown in FIG. 2, the External Trigger 244 may include an indication of an image, such as a pointer to the image. In this way the External Trigger 244 may indicate an image that the user of Content Owner/Author Computer 204 has selected (e.g. through a graphical user interface of Content Owner/Author Computer 204) to be included within a text-fragment that is to be added to Content Text File 246. For example, the External Trigger 244 may include a pointer to an image that the user of Content Owner/Author Computer 204 dragged into or over a predetermined directory or folder graphical object associated with Fragment Editor 214, e.g. within a user interface that is external to User Interface 224, for example within a virtual desktop graphical user interface provided to a user of Content Owner/Author Computer 204 by program code executing on Content Owner/Author Computer 204. The Fragment Editor 214 may then generate meta-data for the text-fragment by, at least in part, storing at least one pointer to the image indicated by the user to be associated with the text-fragment into the meta-data for the text-fragment.

In one embodiment, the Fragment Editor 214 stores multiple pointers to the selected image into the meta-data for the text-fragment. Each of the pointers to the image stored in the text-fragment metadata points to a different size version of the image selected by the user for association with the text-fragment. For example, the pointers to the image stored into the text-fragment meta-data by the Fragment Editor 214 may include a first pointer pointing to a first version of the image that is a thumbnail version of the image, a second pointer pointing to a second version of the image that is a small device size version of the image suitable for display on target devices having relatively small display screens, and a third pointer pointing to a third version of the image that is a large device size version of the image, that is larger than the small device size version of the image and suitable for display on target devices having relatively large display screens. Generating publishable output (e.g. Publishable Output 256 and/or Draft Output 258) by the Output Generator 218 may include storing the multiple pointers into a Web page generated based on the text-fragment, so that the multiple sizes of the image are available to be selectively displayed based on the type of target device the Web page is ultimately displayed on.

Further during operation of the embodiment shown in FIG. 2, the Output Generator 218 may generate output (e.g. Publishable Output 256 and/or Draft Output 258) by, at least in part, generating markup language (e.g. HTML) for multiple Web pages, for example as parts of a Web site, based on the Content Text File 246 and the User Selected Theme(s) 254. Accordingly, each of Publishable Output 256 and/or Draft Output 258 may, for example, be made up of or include one or more Web pages in a Web site. Each of the Web pages generated by Output Generator 218 may correspond to and/or be based on the contents of one or more of the text-fragments in the Content Text File 246. Each of the Web pages generated by Output Generator 218 and stored within the Publishable Output 256 and/or Draft Output 258 may include a pointer or pointers to one or more images, where the pointer(s) to the image(s) are obtained from the metadata of a text-fragment used to generate the Web page. Each of the Web pages generated by Output Generator 218 and stored within the Publishable Output 256 and/or Draft Output 258 may also or alternatively include text of one or more text-fragments used to generate the Web page. Accordingly, one or more of the Web pages generated by Output Generator 218 and stored within the Publishable Output 256 and/or Draft Output 28 may contain and display when rendered on a target device i) one or more images based on a pointer or pointers to the image(s) contained in the metadata of the text-fragment(s) corresponding to the Web page, and ii) text from the text-fragment(s) corresponding to the Web page.

Further during operation of the embodiment shown in FIG. 2, at least one versioning label may be received by the Fragment Editor 214, for example from a user through the User Interface 224, for association with at least one text-fragment. For example, the versioning label may be received by Fragment Editor 214 through the Editor API 216 as part of Text Inputs 240. The Fragment Editor 214 may, for example, associate the versioning label with one of the text-fragments in Content Text File 246 when generating the text-fragment, by storing the versioning label into the metadata for the text-fragment. The versioning label stored into the metadata for a text-fragment may indicate whether that text-fragment is to used when generating either Publishable Output 256 and/or Draft Output 258. In this way the embodiment of FIG. 2 may create different versions of publishable output in response to versioning labels stored within the meta-data of the text-fragments contained in the Content Text File 246.

A versioning label stored in the meta-data of a text-fragment may be a draft label. The Output Generator 218 processes Content Text File 246 to generate Publishable Output 256 by i) identifying text-fragments in Content Text File 246 that have a draft label stored in their metadata, and ii) generating the Publishable Output 256 based only on those text-fragments in Content Text File 246 that do not have a draft label stored in their metadata. Any text-fragments in Content Text File 246 that have a draft label stored in their metadata are ignored by Output Generator 218 when generating Publishable Output 256.

The Output Generator 218 may further process Content Text File 246 to generate Draft Output 258 based on both those text-fragments in Content Text File 246 that have a draft label stored in their metadata and those text-fragments in Content Text File 246 that do not have a draft label stored in their metadata.

The embodiment of FIG. 2 may then distribute Draft Output 258 to a number of reviewing users. The reviewing users may, for example, provide their feedback on the Draft Output 258 to a user of Content Owner/Author Computer 204 using any appropriate communication system, such as electronic mail, etc. The user of Content Owner/Author Computer 204 may then, after a sufficient number of the reviewing users have approved the Draft Output 258 for general publication, indicate that the Draft Output 258 may be released beyond the reviewing users, e.g. published to the general public. For example, the user of Content Owner/Author Computer 204 may indicate that Draft Output 258 is to be published by selecting (e.g. clicking on) a button, menu item, etc., contained in the User Interface 224, causing a Publish command 243 to be issued to the Editor API 216 of the Fragment Editor 214. In response to receipt of the Publish command 243, the Fragment Editor 214 modifies the text-fragments in the Content Text File 246 by removing the draft label from the metadata of those text-fragments in the Content Text File 246 that have a draft label. The Output Generator 218 then generates a new version of the Publishable Output 256, after the text-fragments in the Content Text File 246 have been modified by the Fragment Editor 214 to remove any draft labels from their metadata.

The disclosed system may further be embodied such that a versioning label stored in the meta-data of a text-fragment may be an update label. In such an embodiment, the Output Generator 218 processes Content Text File 246 to generate Publishable Output 256 by i) identifying text-fragments in Content Text File 246 that have either an update label or a draft label stored in their metadata, and ii) generating the Publishable Output 256 based only on those text-fragments in Content Text File 246 that do not have either an update label or a draft label stored in their metadata. Any text-fragments in Content Text File 246 that have either a draft label or an update label stored in their metadata are ignored by Output Generator 218 when generating Publishable Output 256.

The Output Generator 218 may process Content Text File 246 to generate Draft Output 258 based on both those text-fragments in Content Text File 246 that have either an update label or a draft label stored in their metadata, as well as on those text-fragments in Content Text File 246 that do not have either a draft label or an update label stored in their metadata. Each text-fragment in Content Text File 246 that includes an update label in its metadata also includes a pointer to another text-fragment in Content Text File 246 that the text-fragment having the update label is intended to eventually replace in the Publishable Output 256. Accordingly, the Output Generator 218 may generate Draft Output 258 based both on those text-fragments in Content Text File 246 that have either an update label or a draft label stored in their metadata, and on those text-fragments in Content Text File 246 that do not have either a draft label or an update label stored in their metadata, but ignoring those text-fragments in Content Text File 246 indicated by pointers in the metadata of text-fragments having an update label.

In response to receipt of the Publish command 243, the Fragment Editor 214 may modify the text-fragments in the Content Text File 246 by removing the draft label from the metadata of those text-fragments in the Content Text File 246 that have a draft label, and by removing the update label from the metadata of those text-fragments in the Content Text File 246 that have an update label. The Fragment Editor 214 may further modify the text-fragments in the Content Text File 246 in response to the Publish command 243 by removing the text-fragments from Content Text File 246 that were indicated (e.g. by pointers) as text-fragments to be replaced by the text-fragments that include the update label in their metadata.

The disclosed system may further be embodied such that the arrangement of the text-fragments within the Content Text File 246 indicates a text-fragment ordering. For example, the text-fragments in Content Text File 246 may be considered to have an ordering based on the order in which they are located in Content Text File 246, with the text-fragment located at the beginning of Content Text File 246 being considered to be the first in the ordering, and the text-fragment located at the end of Content Text File 246 being considered to be the last in the ordering. In such an embodiment, the Output Generator 218 generates the Publishable Output 256 based on the ordering of the text-fragments within the Content Text File 246. For example, the Output Generator 218 may generate the Publishable Output 256 such that the sections in the Publishable Output 256 are ordered within Publishable Output 256 based on the ordering of corresponding text-fragments within Content Text File 246.

As further illustrated by the embodiment shown in FIG. 2, the Content Text File 246 is made up of text, and is accordingly human editable, such that it can be edited using a Fragment Editor 214 embodied as or including a text editor or the like. Similarly, the Fragment Editor 214 may be embodied using any kind of editor that is suitable for editing software program source code or the like. Thus the text-fragments in Content Text File 246 may be may be directly edited by users who understand the disclosed syntax for fragment delimiters and metadata, and can accordingly manually add, modify, re-order and/or delete the text-fragments in the Content Text File 246 directly using such a text editor. At the same time, other less-sophisticated users can edit the text-fragments in the file indirectly using external user interfaces that generate content (e.g. images selected on the virtual desktop to be included in corresponding text-fragments), that may be passed as or within External Trigger 244 through the Editor API 216 into Fragment Editor 214 for inclusion in one or more text-fragments contained in Content Text File 246.

Figure 3:
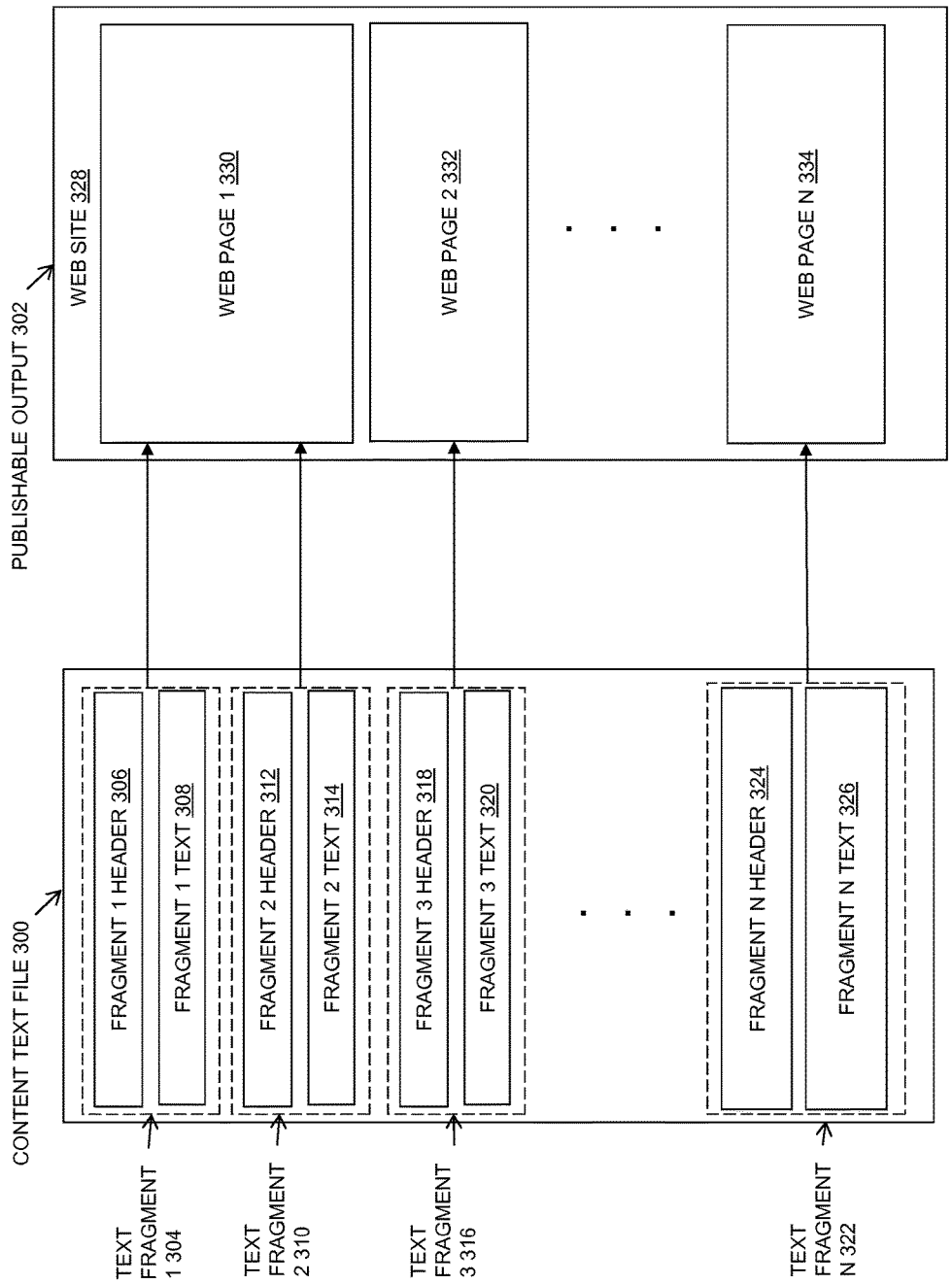
FIG. 3 is a block diagram illustrating the generation of publishable output from a content text file in an illustrative embodiment.

FIG. 3 is a block diagram illustrating the generation of publishable output from a content text file in an illustrative embodiment, as for example performed by the Output Generator 218 shown in FIG. 2. As shown in FIG. 3, the Output Generator 218 (FIG. 1) generates Publishable Output 302 based on Content Text File 300 and one or more User Selected Theme(s) 254 (FIG. 1). For example, the Publishable Output 302 in FIG. 3 includes a Web Site 328 with a number of Web pages, shown for purposes of illustration by Web Page 1 330, Web Page 2 332, through Web Page N 334. The Web pages in Web Site 328 are each generated based on one of more of the text-fragments contained in Content Text File 300. The text-fragments contained in Content Text File 300 are shown for purposes of illustration as including Text Fragment 1 304 having Fragment 1 Header 306 and Fragment 1 Text 308, Text Fragment 2 310 having Fragment 2 Header 312 and Fragment 2 Text 314, Text Fragment 3 316 having Fragment 3 Header 318 and Fragment 3 Text 320, through Text Fragment N 322 having Fragment N Header 324 and Fragment N Text 326. Further for purposes of illustration, Web Page 1 330 is generated based on Text Fragment 1 304 and Text Fragment 2 310, Web Page 2 332 is generated based on Text Fragment 3 316, and so on through Web Page N 334 which is generated based on Text Fragment N 322.

Figure 4:
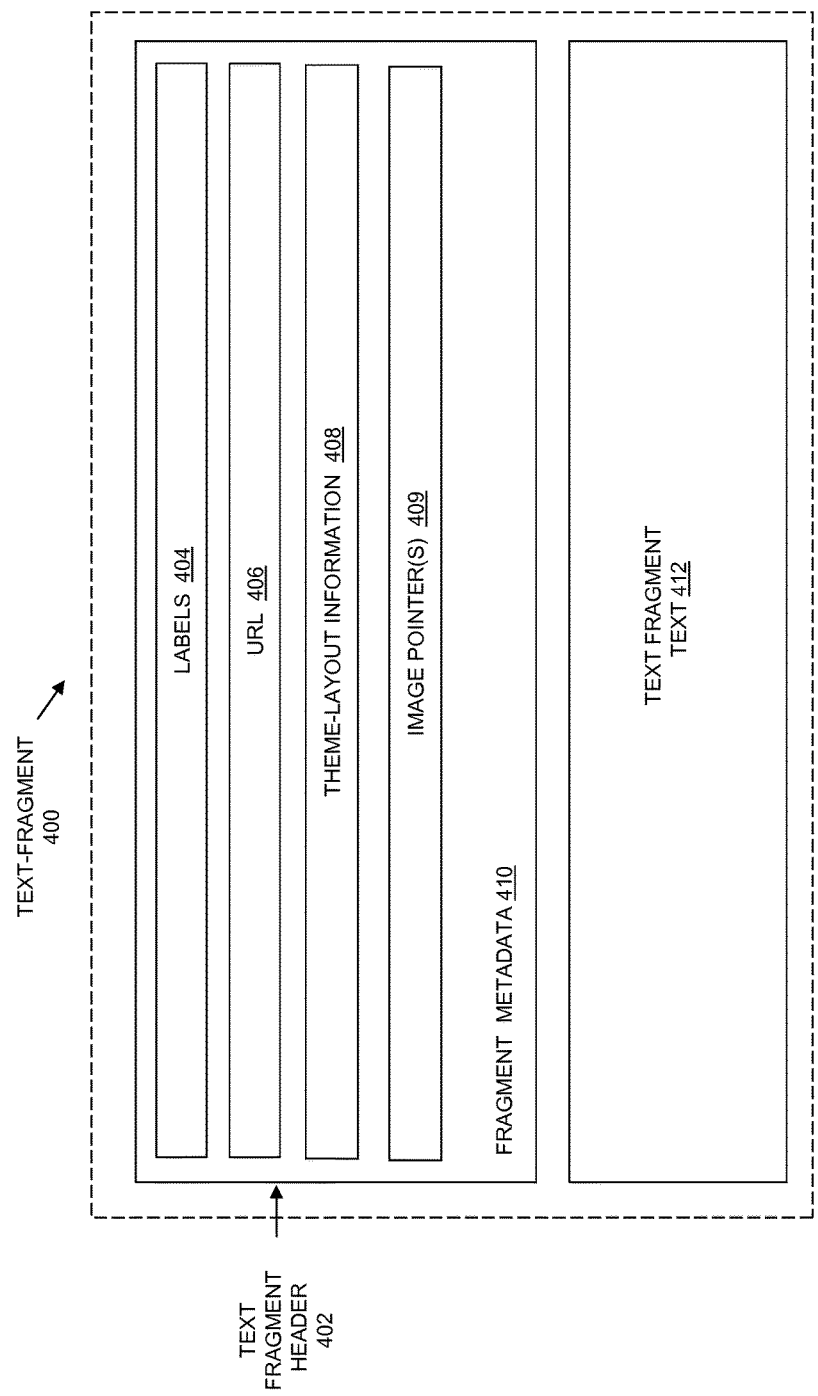
FIG. 4 is a block diagram showing an example of a text fragment in an illustrative embodiment.

FIG. 4 is a block diagram showing an example of a text fragment in an illustrative embodiment. As shown in FIG. 4, a Text-Fragment 400 includes Text-Fragment Header 402 and Text-Fragment Text 412. The text contained in Text-Fragment Text 412 may, for example, be contained in a Web page generated within Publishable Output 256 based at least in part on Text-Fragment 400.

The illustrative Text-Fragment Header 402 of FIG. 4 includes Fragment Metadata 410, shown for purposes of illustration as including Labels 404, a URL 406, Theme-Layout Information 408, and Image Pointer(s) 409. The Labels 404 include information that may be used by the Output Generator 218 to determine whether Text-Fragment 400 is to be used to generate a Web page or the like contained in Publishable Output 256 or Draft Output 258. The URL 406 may be used to indicate a Web page generated based on Text-Fragment 400, for example as part of a Web site within Publishable Output 256 or Draft Output 258.

The Theme-Layout Information 408 may, for example, be used by Output Generator 218 to determine the appearance of a Web page generated within Publishable Output 256 based at least in part on Text-Fragment 400. For example, Theme-Layout Information 408 may be applied to Text-Fragment 400 at least in part from User Selected Theme(s) 254 shown in FIG. 1.

Image Pointer(s) 409 may, for example, include at least one pointer to an image provided by the user for the Text-Fragment 400. In one embodiment, Image Pointer(s) 409 may include multiple image pointers for Text-Fragment 400, where each of the pointers points to a different size version of the image provided by the user for Text-Fragment 400. For example, Image Pointer(s) 409 may include a first pointer pointing to a first version of the image that is a thumbnail version of the image, a second pointer pointing to a second version of the image that is a small device size version of the image suitable for display on target devices having relatively small display screens, and a third pointer pointing to a third version of the image that is a large device size version of the image, that is larger than the small device size version of the image and suitable for display on target devices having relatively large display screens. When publishable output is generated based on Text-Fragment 400, such pointers that are stored in Image Pointer(s) 409 may be "embedded" within HTML and/or related files within the publishable output, so that the publishable output corresponding to Text-Fragment 400 can have a desirable appearance on the various screen sizes of the different types of target viewing device(s) to which it may be published. If the type of target display device or platform is known at the time the publishable output is generated, then only those pointers to image sizes appropriate for and/or required by that type of display device or platform will be included in the publishable output for Text-Fragment 400.

A predetermined text string or set of characters may be used as a separator to indicate to the Output Generator 218 the beginning of each text-fragment. Similarly, another, different predetermined text string or set of characters may be used as a separator to indicate to the Output Generator 218 the end of the Text-Fragment Header 402 and the beginning of Text-Fragment Text 412.

Figure 5:
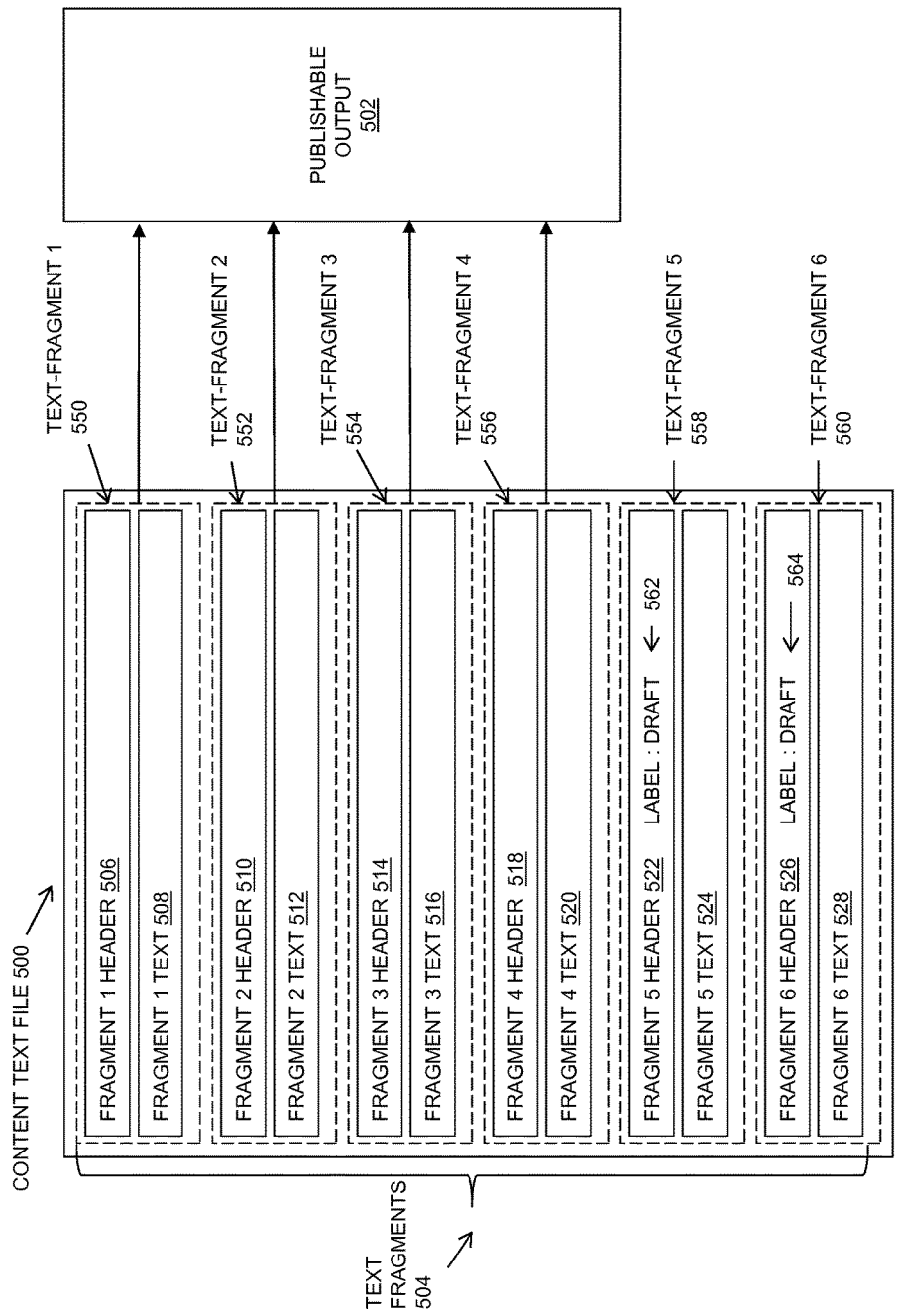
FIG. 5 is a block diagram showing an example of generating a publishable output from a content text file in an illustrative embodiment using draft versioning labels.

FIG. 5 is a block diagram showing an example of generating a publishable output from a content text file in an illustrative embodiment using draft versioning labels. As shown in FIG. 5, a Content Text File 500 is used to generate Publishable Output 502. Content Text File 500 contains Text-Fragments 504, shown for purpose of illustration including Text-Fragment 1 550 having Fragment 1 Header 506 and Fragment 1 Text 508, Text-Fragment 2 552 having Fragment 2 Header 510 and Fragment 2 Text 512, Text-Fragment 3 554 having Fragment 3 Header 514 and Fragment 3 Text 516, Text-Fragment 4 556 having Fragment 4 Header 518 and Fragment 4 Text 520, Text-Fragment 5 558 having Fragment 5 Header 522 and Fragment 5 Text 524, and Text-Fragment 6 560 having Fragment 6 Header 526 and Fragment 6 Text 528.

During generation of the Publishable Output 502, the header of each of the Text-Fragments 504 is checked for versioning labels. If a given text-fragment has a "DRAFT" versioning label in its header, then that text-fragment is ignored for purposes of generating Publishable Output 502. Accordingly, as illustrated in FIG. 5, Text-Fragment 5 558 is ignored when generating Publishable Output 502 because Fragment 5 Header 522 includes the "DRAFT" versioning label 562. Similarly, Text-Fragment 6 560 is ignored when generating Publishable Output 502 because Fragment 6 Header 526 includes the "DRAFT" versioning label 564. Accordingly, Publishable Output 502 is generated based on Text-Fragment 1 550, Text-Fragment 2 552, Text-Fragment 3 554, and Text-Fragment 5 558.

Figure 6:
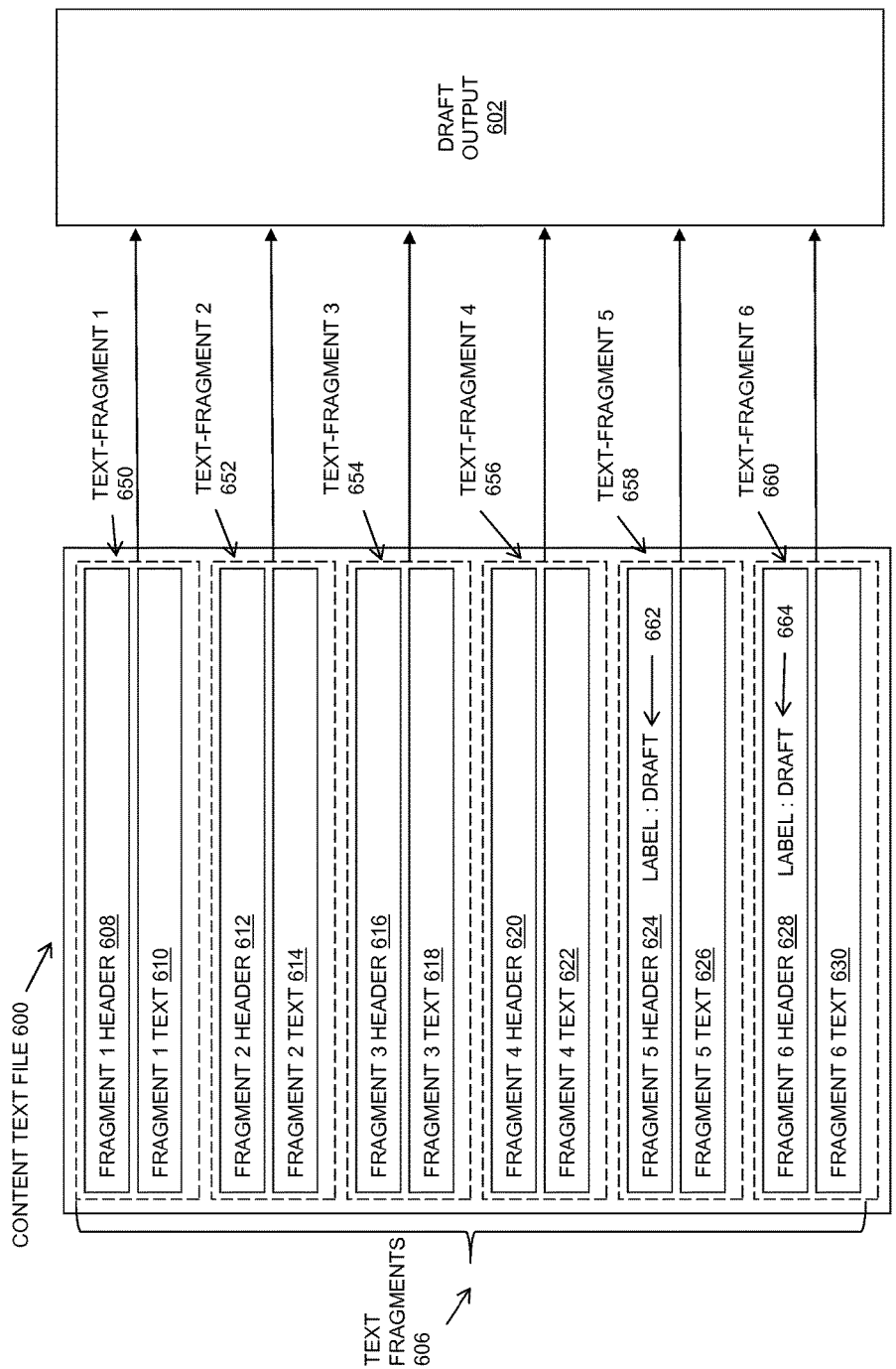
FIG. 6 is a block diagram showing an example of generating a draft output from a content text file in an illustrative embodiment using draft versioning labels.

FIG. 6 is a block diagram showing an example of generating a draft output from a content text file in an illustrative embodiment using draft versioning labels. As shown in FIG. 6, a Content Text File 600 is used to generate Draft Output 602. Content Text File 600 contains Text-Fragments 606, shown for purpose of illustration including Text-Fragment 1 650 having Fragment 1 Header 608 and Fragment 1 Text 610, Text-Fragment 2 652 having Fragment 2 Header 612 and Fragment 2 Text 614, Text-Fragment 3 654 having Fragment 3 Header 616 and Fragment 3 Text 618, Text-Fragment 4 656 having Fragment 4 Header 620 and Fragment 4 Text 622, Text-Fragment 5 658 having Fragment 5 Header 524 and Fragment 5 Text 526, and Text-Fragment 6 660 having Fragment 6 Header 628 and Fragment 6 Text 630.

During generation of the Draft Output 602, the header of each of the Text-Fragments 606 is checked for versioning labels. However, in the case of generating Draft Output 502, if a given text-fragment has a "DRAFT" versioning label in its header, then that text-fragment is used together with the other text-fragments in Text-Fragments 606 to generate Draft Output 602. Accordingly, as illustrated in FIG. 6, even though Text-Fragment 5 658 has a "DRAFT" versioning label 662, and Text-Fragment 6 660 has a "DRAFT" versioning label 664, both Text-Fragment 5 658 and Text-Fragment 6 660 are used together with the other text-fragments in Content Text File 660 to generate Draft Output 602. Accordingly, in the example of FIG. 6, Draft Output 602 is generated based on all of Text-Fragments 606.

Figure 7:
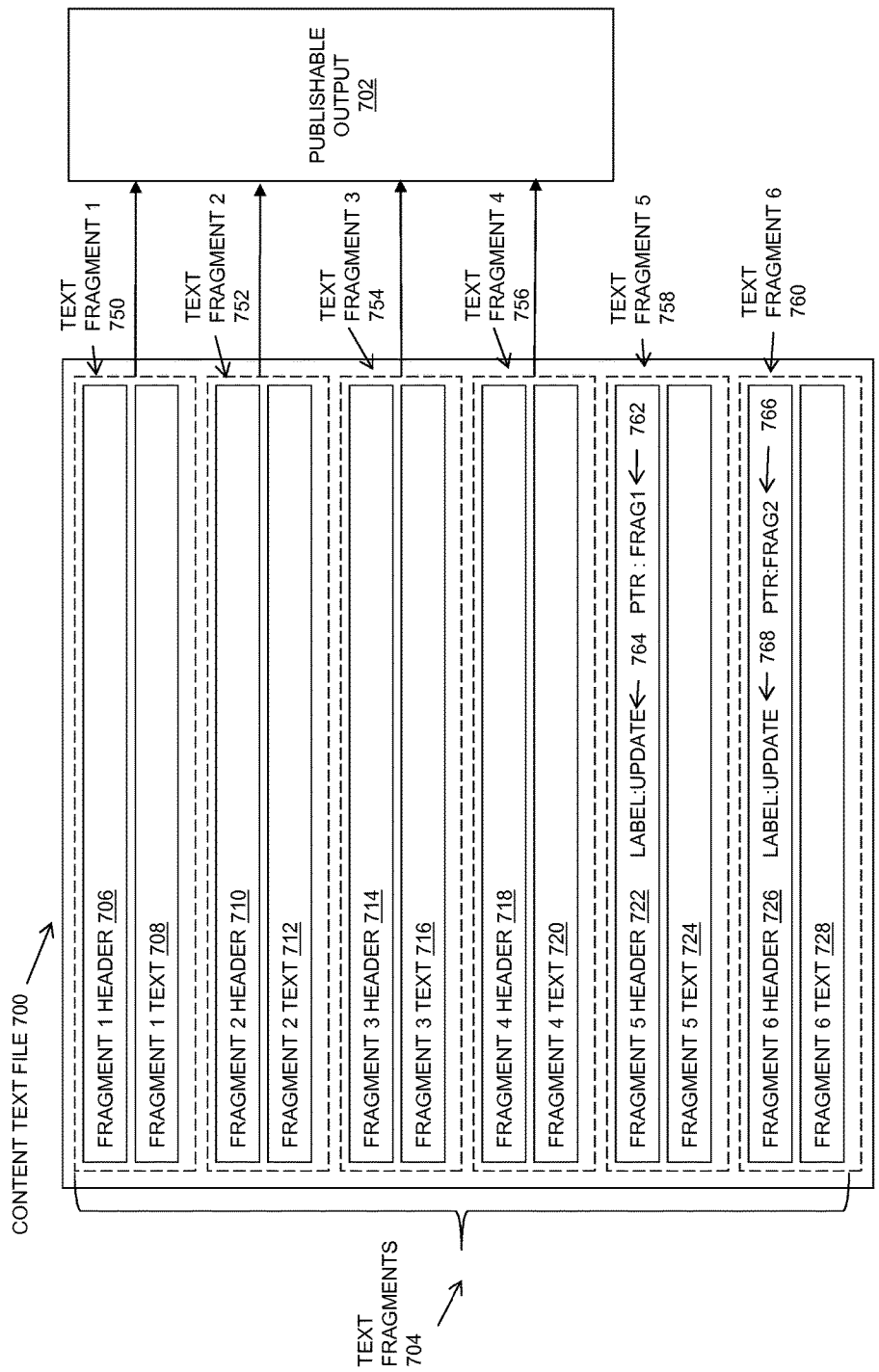
FIG. 7 is a block diagram showing an example of generating a publishable output from a content text file in an illustrative embodiment using update versioning labels.

FIG. 7 is a block diagram showing an example of generating a publishable output from a content text file in an illustrative embodiment using update versioning labels. As shown in FIG. 7, a Content Text File 700 is used to generate Publishable Output 702. Content Text File 700 contains Text-Fragments 704, shown for purpose of illustration including Text-Fragment 1 750 having Fragment 1 Header 706 and Fragment 1 Text 708, Text-Fragment 2 752 having Fragment 2 Header 710 and Fragment 2 Text 712, Text-Fragment 3 754 having Fragment 3 Header 714 and Fragment 3 Text 716, Text-Fragment 4 756 having Fragment 4 Header 718 and Fragment 4 Text 720, Text-Fragment 5 758 having Fragment 5 Header 722 and Fragment 5 Text 724, and Text-Fragment 6 760 having Fragment 6 Header 726 and Fragment 6 Text 728.

During generation of the Publishable Output 702, the header of each of the Text-Fragments 704 is checked for versioning labels. In the case of generating Publishable Output 702, if a given text-fragment has an "UPDATE" versioning label in its header, then that text-fragment is ignored. Accordingly, illustrated in FIG. 7, since Text-Fragment 5 758 has an "UPDATE" versioning label 764, and Text-Fragment 6 760 has an "UPDATE" versioning label 768, both Text-Fragment 5 758 and Text-Fragment 6 760 are ignored (i.e. not used) when generating Publishable Output 702. Accordingly, in the example of FIG. 7, Publishable Output 702 is generated based on Text-Fragment 1 750, Text-Fragment 2 752, Text-Fragment 3 754, and Text-Fragment 4 756.

Subsequently, when a publish command is received (e.g. Publish command 243 shown in FIG. 1), the disclosed system operates to identify the text-fragments having "UPDATE" versioning labels i) remove the "UPDATE" versioning labels from those text-fragments, and ii) replace the text-fragments pointed to by those text-fragments having the "UPDATE" versioning label with the corresponding text-fragment having the "UPDATE" versioning label. For example, in the case of the Content Text File 700 shown in FIG. 7, in response to receipt of a publish command, the disclosed system (e.g. the Fragment Editor 214 shown in FIG. 2), identifies those text-fragments having "UPDATE" versioning labels, in this case Text-Fragment 5 758 and Text-Fragment 6 760. The disclosed system then removes the "UPDATE" versioning label 764 from Text-Fragment 5 758, and removes the "UPDATE" versioning label 768 from Text-Fragment 6 760. The disclosed system then determines the text-fragments pointed to by the text-fragments having "UPDATE" versioning labels. In the example of FIG. 7, the disclosed system determines that Fragment 5 Header 722 includes a pointer 762 ("PTR:FRAG1") indicating Text-Fragment 1 750, and that Fragment 6 Header 726 includes a pointer 766 ("PTR:FRAG2") indicating Text-Fragment 1 750. In response to the pointer 762, the disclosed system replaces Text-Fragment 1 750 with Text-Fragment 5 758. In response to the pointer 766, the disclosed system replaces Text-Fragment 2 752 with Text-Fragment 6 760. Accordingly, the Publishable Output 256 is next generated based on a Content-Text File 700 with Text-Fragment 5 758 having replaced Text-Fragment 1 750, and with Text-Fragment 6 760 having replaced Text-Fragment 2 752.

Figure 8:
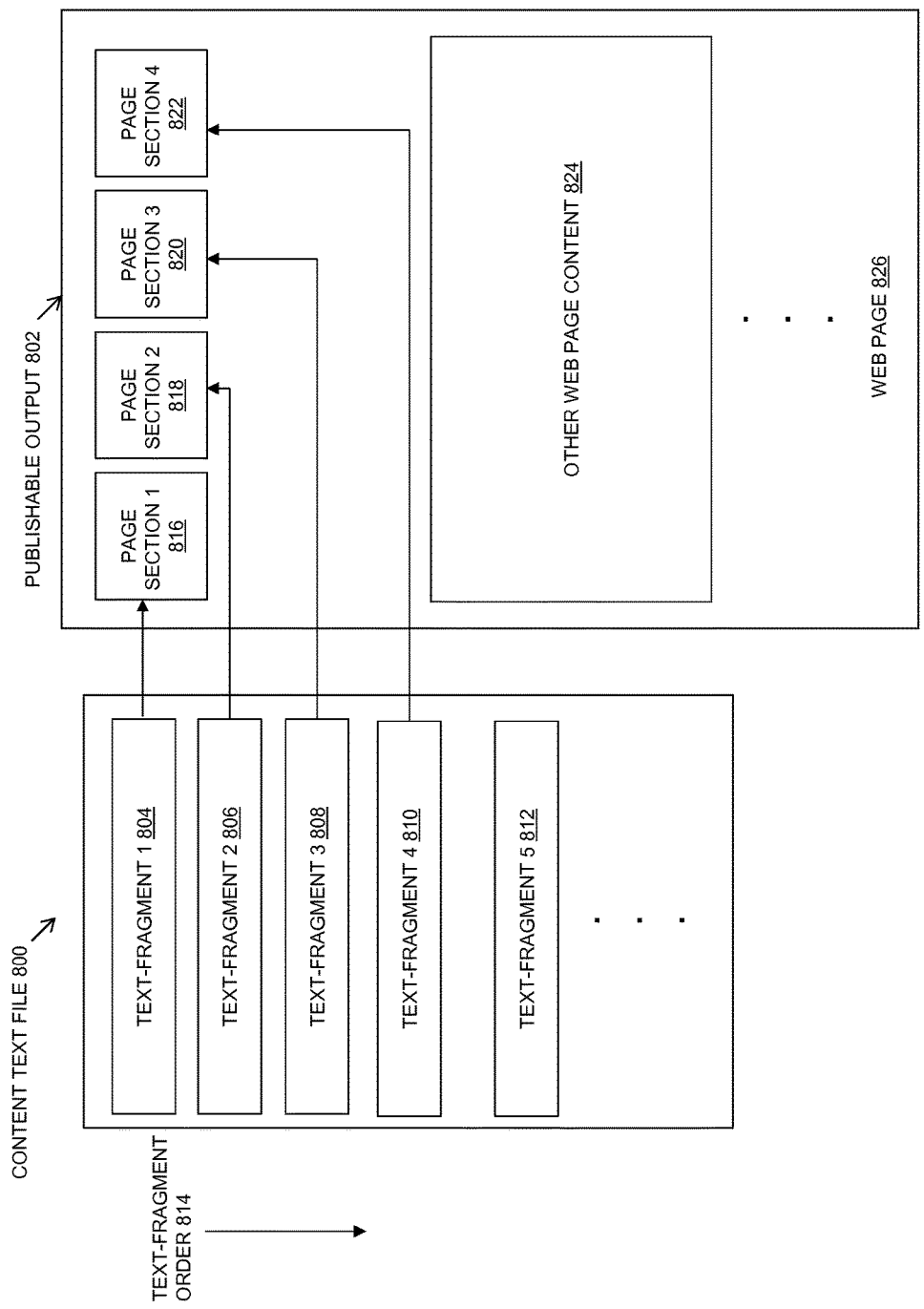
FIG. 8 is a block diagram showing an example of generating a publishable output from a content text file in an illustrative embodiment based on a fragment order in the content text file.

FIG. 8 is a block diagram showing an example of generating a publishable output from a content text file in an illustrative embodiment based on a fragment order in the content text file. As shown in FIG. 8, a Content Text File 800 includes a number of text-fragments, shown for purposes of illustration including Text-Fragment 1 804, Text-Fragment 2 806, Text-Fragment 3 808, Text-Fragment 4 810, Text-Fragment 5 812, etc. The text-fragments in Content Text File 800 are ordered, shown by Text-Fragment Order 814, where Text-Fragment 1 804 is the first text-fragment, Text-Fragment 2 806 is the second text-fragment, Text-Fragment 3 808 is the third text-fragment, and so on. When the Publishable Output 802 is generated based on the Content Text File 800, the elements of Publishable Output 802 are generated with an order in which each page section is contained at a position within the order of the elements Publishable Output 802 corresponding to the position of the text-fragment used to generate that page section within the text-fragments contained in Content Text File 800. Accordingly, Page Section 1 816 is generated based on Text-Fragment 1 804, Page Section 2 818 is generated based on Text-Fragment 2 806, Page Section 3 820 is generated based on Text-Fragment 3 808, and Page Section 4 822 is generated based on Text-Fragment 4, and so on, with Other Web Page Content 824 also being generated based on Text-Fragment 5 812 (and one or more other fragments in Content Text File 800), consistent with Fragment Order 814.

Figure 9:
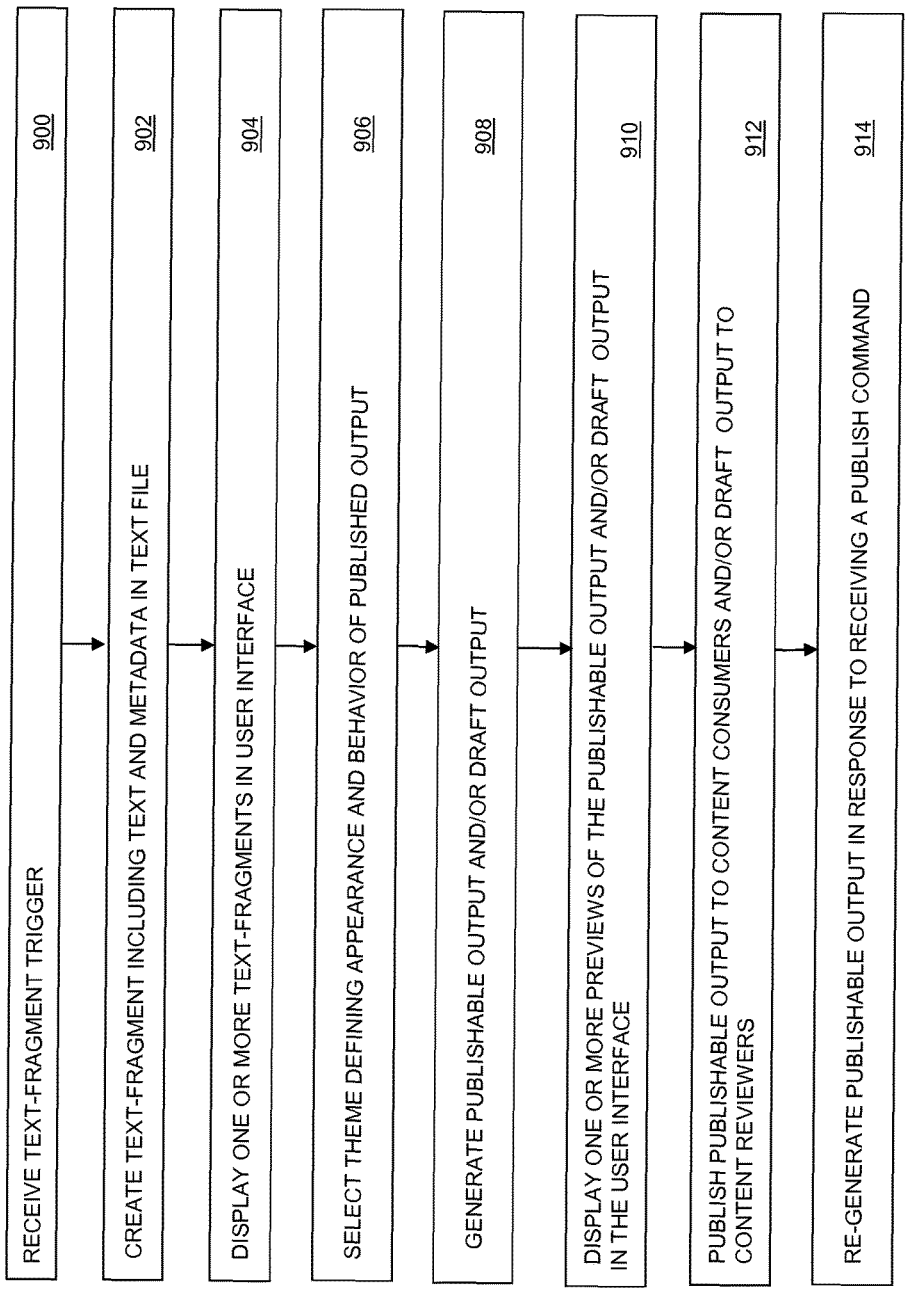
FIG. 9 is a flow chart showing an example of steps performed in an illustrative embodiment.

FIG. 9 is a flow chart showing an example of steps performed in an illustrative embodiment. As shown in FIG. 9, at step 900, a text-fragment trigger is received. In response to receipt of the text-fragment trigger, at step 902 the disclosed system creates a text-fragment by receiving text for the text-fragment and storing the received text into the text-fragment. The disclosed system adds the text-fragment to a text file containing multiple text-fragments, and may display at least one of the text-fragments contained in the text file to a user through at least a first portion of a user interface. At step 904, the disclosed system displays one or more text-fragments in a user interface. For example, the disclosed system may display a current text-fragment being edited by the user in a text editing window.

At step 906, a theme is selected that defines the appearance of a Web page. For example, at step 906 a user may select a theme through a user interface object. At step 908, the disclosed system generates, based on the text-fragments in the text file and the selected theme, a publishable output and/or a draft output. The disclosed system may display one or more previews of the publishable output and/or draft output within one or more preview windows in the user interface at step 910. At step 912, the disclosed system distributes the publishable output to at least one content consumer user, and distributes the draft output to one or more content reviewer user. At step 914, in response to receipt of a publish command, the disclosed system creates a new version of the text file and re-generates the publishable output based on the new version of the text file.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A computer-implemented method of content editing and publishing based on text-fragments, comprising executing, on at least one processor, the steps of:
receiving a plurality of text-fragment creation triggers;
creating, in response to receipt of each one of the plurality of text-fragment creation triggers, a respective one of a plurality of text-fragments at least in part by i) receiving text for the text-fragment, ii) storing the received text into the text-fragment, iii) creating meta-data for the text-fragment, and iv) storing the meta-data for the text-fragment into the text-fragment;
adding each one of the plurality of text-fragments to a single text file, wherein the single text file contains the plurality of text-fragments;
displaying, within a first portion of a user interface, at least one of the plurality of text-fragments contained in the text file;
selecting a theme defining an appearance of a publishable output;
generating, based on the plurality of text-fragments and the selected theme, the publishable output, the generated publishable output having the appearance defined by the selected theme;
displaying a preview of the publishable output within a second portion of the user interface;
publishing the publishable output to at least one remote system;
receiving, through the user interface, at least one versioning label to be associated with at least one text-fragment;
wherein creating the metadata for the text-fragment includes storing the versioning label in the metadata for the text-fragment;
wherein generating the publishable output includes creating different versions of the publishable output in response to the versioning label;

wherein the at least one versioning label includes a draft label;
wherein generating the publishable output includes
i) identifying text-fragments in the text file that have a draft label stored in their metadata, and
ii) generating the publishable output based only on those text-fragments in the text file that do not have a draft label stored in their metadata;
generating a draft output based on both those text-fragments in the text file that have a draft label stored in their metadata and those text-fragments in the text file that do not have a draft label stored in their metadata;
distributing the draft output to a set of target devices associated with reviewing users;
receiving a publish command;
modifying the text-fragments in the text file, responsive to receipt of the publish command, by removing the draft label from the metadata of at least one of the text-fragments in the text file; and
generating a new version of the publishable output, responsive to receipt of the publish command and after modifying the text-fragments in the text file.

2. The method of claim 1, further comprising:
wherein one of the text-fragment creation triggers includes a text-fragment name provided by a user; and
wherein creating the meta-data for a respective one of the text fragments includes generating a uniform resource locator (URL) for the text-fragment based on the text-fragment name provided by the user, and storing the URL for the text-fragment in the meta-data for the text-fragment.

3. The method of claim 1, further comprising:
wherein one of the text-fragment creation triggers includes an image provided by a user; and
wherein creating the meta-data for a respective one of the text-fragments includes storing at least one pointer to the image provided by the user for the text-fragment in the meta-data for the text-fragment.

4. The method of claim 3, wherein storing at least one pointer to the image provided by the user for the text-fragment in the meta-data for the text-fragment includes storing a plurality of pointers in the meta-data for the text-fragment, wherein each of the plurality of pointers points to a different size version of the image provided by the user.

5. The method of claim 4, further comprising:
wherein the plurality of pointers includes
a first pointer pointing to a first version of the image, wherein the first version of the image is a thumbnail version of the image,
a second pointer pointing to a second version of the image, wherein the second version of the image is a small device size version of the image, the small device size version of the image suitable for display on target devices having a relatively small display screen, and
a third pointer pointing to a third version of the image, wherein the third version of the image is a large device size version of the image, the large device size version of the image being larger than the small device size version of the image and suitable for display on target devices having a relatively large display screen; and
wherein generating the publishable output includes storing the plurality of pointers in the publishable output.

6. The method of claim 5, wherein generating the publishable output further comprises:

generating a plurality of Web pages, each of the plurality of Web pages corresponding to at least one of the text-fragments in the text file; and
wherein at least one of Web pages displays i) an image based on a pointer to the image contained in the metadata of a text-fragment corresponding to the Web page, and ii) the text of the text-fragment corresponding to the Web page.

7. A computer-implemented method of content editing and publishing based on text-fragments, comprising executing, on at least one processor, the steps of:
receiving a plurality of text-fragment creation triggers;
creating, in response to receipt of each one of the plurality of text-fragment creation triggers, a respective one of a plurality of text-fragments at least in part by i) receiving text for the text-fragment, ii) storing the received text into the text-fragment, iii) creating meta-data for the text-fragment, and iv) storing the meta-data for the text-fragment into the text-fragment;
adding each one of the plurality of text-fragments to a single text file, wherein the single text file contains the plurality of text-fragments;
displaying, within a first portion of a user interface, at least one of the plurality of text-fragments contained in the text file;
selecting a theme defining an appearance of a publishable output;
generating, based on the plurality of text-fragments and the selected theme, the publishable output, the generated publishable output having the appearance defined by the selected theme;
displaying a preview of the publishable output within a second portion of the user interface;
publishing the publishable output to at least one remote system;
receiving, through the user interface, at least one versioning label to be associated with at least one text-fragment;
wherein creating the metadata for the text-fragment includes storing the versioning label in the metadata for the text-fragment;
wherein generating the publishable output includes creating different versions of the publishable output in response to the versioning label;
wherein the at least one versioning label includes an update label;
wherein creating the metadata for each text-fragment that includes an update label includes storing the update label in the metadata for the text-fragment and storing a pointer to a previously published text-fragment to be replaced by the text-fragment in the metadata for the text-fragment;
wherein generating the publishable output includes
i) identifying text-fragments in the text file that have an update label stored in their metadata, and
ii) generating the publishable output based only on those text-fragments in the text file that do not have an update label stored in their metadata;
generating a draft output based on both those text-fragments in the text file that have an update label stored in their metadata and those text-fragments in the text file that do not have an update label stored in their metadata, without those previously published text-fragments that are to be replaced by the text-fragments that have an update label stored in their metadata;
distributing the draft output to a set of target devices associated with reviewing users;

receiving a publish command;

modifying the text-fragments in the text file, responsive to receipt of the publish command, by removing the text-fragments that are to be replaced by the text-fragments that have an update label stored in their metadata and removing the update label from the metadata of at least one of the text-fragments; and generating a new version of the publishable output, responsive to receipt of the publish command and after modifying the text-fragments in the text file.

8. The method of claim 1, wherein receiving at least one of the text-fragment triggers includes receiving the text-fragment trigger through a user interface.

9. The method of claim 1, wherein receiving at least one of the text-fragment triggers includes receiving the text-fragment trigger from a separate application through an application programming interface.

10. The method of claim 1, wherein receiving text for at least one of the text-fragments includes receiving the text for the text-fragment through the user interface.

11. The method of claim 1, wherein receiving text for at least one of the text-fragments includes receiving the text for the text-fragment through the application programming interface.

12. The method of claim 1, further comprising:
wherein an arrangement of the plurality of text-fragments contained within the text file indicates a text-fragment ordering; and
wherein generating the publishable output includes generating content within the publishable output based on the text-fragment ordering indicated by the arrangement of the text-fragments within the text file.

13. The method of claim 1, wherein the text file is human-editable.

14. The method of claim 1, wherein generating the publishable output comprises generating HyperText Markup Language (HTML).

15. The method of claim 1, further comprising:
wherein the selected theme defines the appearance of at least one Web page; and
wherein generating the publishable output includes generating at least one Web page having the appearance defined by the selected theme.

16. An apparatus, comprising:
processing circuitry including at least one processor;
a memory having program code stored thereon for content editing and publishing based on text-fragments, wherein the program code, when executed by the processor, causes the processor to
create, in response to receipt of each one of a plurality of text-fragment creation triggers, a respective one of a plurality of text-fragments at least in part by i) receiving text for the text-fragment, ii) storing the received text into the text-fragment, iii) creating meta-data for the text-fragment, and iv) storing the meta-data for the text-fragment into the text fragment;
add each one of the text-fragments to a single text file, wherein the single text file contains the plurality of text-fragments;
display, within a first portion of a user interface, at least one of the plurality of text-fragments contained in the text file;
select a theme defining an appearance of a publishable output;
generate, based on the plurality of text-fragments and the selected theme, the publishable output, the generated publishable output having the appearance defined by the selected theme;
display a preview of the publishable output within a second portion of the user interface;
publish the publishable output to at least one remote system;
receive, through the user interface, at least one versioning label to be associated with at least one text-fragment;
wherein the metadata for the text-fragment is created at least in part by storing the versioning label in the metadata for the text-fragment;
wherein the publishable output is generated at least in part by creating different versions of the publishable output in response to the versioning label;
wherein the at least one versioning label includes a draft label;
wherein the publishable output is generated at least in part by
i) identifying text-fragments in the text file that have a draft label stored in their metadata, and
ii) generating the publishable output based only on those text-fragments in the text file that do not have a draft label stored in their metadata;
generate a draft output based on both those text-fragments in the text file that have a draft label stored in their metadata and those text-fragments in the text file that do not have a draft label stored in their metadata;
distribute the draft output to a set of target devices associated with reviewing users;
receive a publish command;
modify the text-fragments in the text file, responsive to receipt of the publish command, by removing the draft label from the metadata of at least one of the text-fragments in the text file; and
generate a new version of the publishable output, responsive to receipt of the publish command and after modifying the text-fragments in the text file.

17. The apparatus of claim 16, further comprising:
wherein one of the text-fragment creation triggers includes a text-fragment name provided by a user;
wherein the program code causes the processor to create the meta-data for a respective one of the text-fragments by, at least in part, generating a uniform resource locator (URL) for the text-fragment based on the text-fragment name provided by the user, and storing the URL for the text-fragment in the meta-data for the text-fragment.

18. The apparatus of claim 16, further comprising:
wherein one of the text-fragment creation triggers includes an image provided by a user; and
wherein the program code causes the processor to create the meta-data for a respective one of the text-fragments by, at least in part, storing at least one pointer to the image provided by the user for the text-fragment in the meta-data for the text-fragment.

19. The apparatus of claim 18, wherein the program code causes the processor to store at least one pointer to the image provided by the user for the text-fragment in the meta-data for the text-fragment by, at least in part, storing a plurality of pointers in the meta-data for the text-fragment, wherein each of the plurality of pointers points to a different size version of the image provided by the user.

20. The apparatus of claim 19, further comprising:
wherein the plurality of pointers includes
- a first pointer pointing to a first version of the image, wherein the first version of the image is a thumbnail version of the image,
- a second pointer pointing to a second version of the image, wherein the second version of the image is a small device size version of the image, the small device size version of the image suitable for display on target devices having a relatively small display screen, and
- a third pointer pointing to a third version of the image, wherein the third version of the image is a large device size version of the image, the large device size version of the image being larger than the small device size version of the image and suitable for display on target devices having a relatively large display screen; and wherein the program code causes the processor to generate the publishable output by, at least in part, storing the plurality of pointers in the publishable output.

21. The apparatus of claim 20, wherein the program code causes the processor to generate the publishable output by, at least in part:
generating a plurality of web pages, each of the plurality of web pages corresponding to at least one of the text-fragments in the text file; and
wherein at least one of web pages displays i) an image based on a pointer to the image contained in the metadata of a text-fragment corresponding to the web page, and ii) the text of the text-fragment corresponding to the web page.

22. A non-transitory computer readable medium for content editing and publishing based on text-fragments, comprising instructions stored thereon, that when executed on a processor, perform the steps of:
receiving a plurality of text-fragment creation triggers;
creating, in response to receipt of each one of the plurality of text-fragment creation triggers, a respective one of a plurality of text-fragments at least in part by i) receiving text for the text-fragment, ii) storing the received text into the text-fragment, iii) creating meta-data for the text-fragment, and iv) storing the meta-data for the text-fragment into the text-fragment;
adding each one of the plurality of text-fragments to a single text file, wherein the single text file contains the plurality of text-fragments;
displaying, within a first portion of a user interface, at least one of the plurality of text-fragments contained in the text file;
selecting a theme defining an appearance of a publishable output;
generating, based on the plurality of text-fragments and the selected theme, the publishable output, the generated publishable output having the appearance defined by the selected theme;
displaying a preview of the publishable output within a second portion of the user interface;
publishing the publishable output to at least one remote system;
receiving, through the user interface, at least one versioning label to be associated with at least one text-fragment;
wherein creating the metadata for the text-fragment includes storing the versioning label in the metadata for the text-fragment;
wherein generating the publishable output includes creating different versions of the publishable output in response to the versioning label;
wherein the at least one versioning label includes a draft label;
wherein generating the publishable output includes
i) identifying text-fragments in the text file that have a draft label stored in their metadata, and
ii) generating the publishable output based only on those text-fragments in the text file that do not have a draft label stored in their metadata;
generating a draft output based on both those text-fragments in the text file that have a draft label stored in their metadata and those text-fragments in the text file that do not have a draft label stored in their metadata;
distributing the draft output to a set of target devices associated with reviewing users;
receiving a publish command;
modifying the text-fragments in the text file, responsive to receipt of the publish command, by removing the draft label from the metadata of at least one of the text-fragments in the text file; and
generating a new version of the publishable output, responsive to receipt of the publish command and after modifying the text-fragments in the text file.

* * * * *